United States Patent
Li

(10) Patent No.: US 11,110,959 B2
(45) Date of Patent: Sep. 7, 2021

(54) STEERING CONTROL DEVICE FOR TRACKLESS TRAIN AND CONTROL METHOD THEREFOR

(71) Applicants: Southwest Jiaotong University, Chengdu (CN); Qunzhan Li, Chengdu (CN)

(72) Inventor: Qunzhan Li, Chengdu (CN)

(73) Assignees: SOUTHWEST JIAOTONG UNIVERSITY, Sichuan (CN); Qunzhan Li, Sichuan (CN)

( * ) Notice: Subject to any disclaimer, the term of this patent is extended or adjusted under 35 U.S.C. 154(b) by 52 days.

(21) Appl. No.: 16/086,507

(22) PCT Filed: Apr. 11, 2017

(86) PCT No.: PCT/CN2017/080013
§ 371 (c)(1),
(2) Date: Sep. 19, 2018

(87) PCT Pub. No.: WO2017/177885
PCT Pub. Date: Oct. 19, 2017

(65) Prior Publication Data
US 2019/0106150 A1 Apr. 11, 2019

(30) Foreign Application Priority Data
Apr. 12, 2016 (CN) .......................... 201610223568.9

(51) Int. Cl.
*B62D 12/02* (2006.01)
*B62D 13/00* (2006.01)
*B62D 6/00* (2006.01)
*B62D 15/02* (2006.01)

(52) U.S. Cl.
CPC ............. *B62D 12/02* (2013.01); *B62D 6/003* (2013.01); *B62D 13/00* (2013.01); *B62D 15/0215* (2013.01)

(58) Field of Classification Search
None
See application file for complete search history.

(56) References Cited

U.S. PATENT DOCUMENTS 4,399,884 A * 8/1983 Vandehey ............... B62D 15/00
180/23
5,042,957 A * 8/1991 Arita ....................... E01C 23/06
14/2.4

(Continued)

FOREIGN PATENT DOCUMENTS

CN 1071382 A 4/1993
CN 1486259 A 3/2004
(Continued)

OTHER PUBLICATIONS

The first Office Action of the parallel application in Japan.
(Continued)

*Primary Examiner* — Nicholas K Wiltey
*Assistant Examiner* — Tiffany K Luu
(74) *Attorney, Agent, or Firm* — Volpe Koenig

(57) ABSTRACT

A trackless train is formed of a locomotive hinged to carriages of N trailers. A controller is provided at the locomotive, wherein an input end of the controller is connected to an output end of a clock, an odometer and the steering angle meter, and an output end of the controller is connected to an input end of the steering mechanism of each one of the trailers via an optical network. The controller can fully describe and control a travelling track of the trackless train, such that the steered wheels of the trailer carriages and the steering drive wheels of the locomotives maintain the same track during travel.

8 Claims, 2 Drawing Sheets

(56) References Cited

U.S. PATENT DOCUMENTS

| | | | | |
|---|---|---|---|---|
| 2013/0312634 A1* | 11/2013 | Smit | .................. | B61F 5/386 |
| | | | | 105/168 |
| 2015/0122560 A1* | 5/2015 | Elrabaa | ................ | B62D 12/02 |
| | | | | 180/14.2 |
| 2015/0367885 A1* | 12/2015 | Bruns | .................. | B62D 13/00 |
| | | | | 280/408 |
| 2016/0039369 A1* | 2/2016 | Flaster | .................. | B60R 25/10 |
| | | | | 307/10.1 |
| 2018/0043930 A1* | 2/2018 | Li | ......................... | B62D 7/14 |

FOREIGN PATENT DOCUMENTS

| | | | |
|---|---|---|---|
| CN | 102358345 | A | 2/2012 |
| CN | 102582686 | A | 7/2012 |
| CN | 104228934 | A | 12/2014 |
| CN | 105292256 | A | 2/2016 |
| CN | 105292257 | A | 2/2016 |
| CN | 105857394 | A | 8/2016 |
| CN | 205652208 | U | 10/2016 |
| DE | 43 41 636 | A1 | 6/1995 |
| EP | 1 847 442 | A2 | 10/2007 |
| JP | 4125435 | B2 | 4/1992 |

OTHER PUBLICATIONS

The second Office Action of the parallel application in Japan.
Supplementary European Search Report of parallel application No. 17 78 1861, dated May 14, 2019.

* cited by examiner

STEERING CONTROL DEVICE FOR TRACKLESS TRAIN AND CONTROL METHOD THEREFOR

CROSS REFERENCE TO RELATED APPLICATIONS

This application is a 35 USC 371 national stage application of PCT/CN2017/080013, which was filed Apr. 11, 2017 and claimed priority to CN 201610223568.9, which was filed Apr. 12, 2016, both of which are incorporated herein by reference as if fully set forth.

FIELD OF THE INVENTION

The present invention relates to the field of public transportation, in particular to an articulated bus steering control technology.

BACKGROUND OF THE INVENTION

In urban public transportation, subways and light rails have exclusive right for roads, and they have unique advantages such as no traffic jams and large traffic volume. However, they have require long construction period and high cost and thus are far from being as popular as the economic and convenient public transportation on the ground. Urban road traffic congestion and resource shortages are also indisputable facts. Therefore, improving the traffic capacity has become an eternal issue. Ground public transportation mainly includes buses and trams. Compared with buses, trams have improved transport capacity. However, the trams require additional investment such as track construction and affect the aesthetics of the road as their rails change the smoothness of the road surface. In addition, the wheel and rail operation is noisy, which is unfavorable to the city's environmental protection. Also, when the trams are in line with other vehicles, as is the usual case, these other vehicles will restrict the transport capacity of the trams. Obviously, the most economical and practical way to improve public transport capacity is the buses. In order to enhance transport capacity of the buses, two-carriage articulated buses have been developed and buses with more articulated carriages are being under development. In 2012, the Fraunhofer Institute for Transportation and Infrastructure Systems in Germany developed a new world's longest bus with 3 carriages (double articulated) and 4 steered wheels, with a length of up to 30 meters and a capacity of 256 seats. According to reports, "the bus is installed with a special control system to ensure that the last carriage travels along the trajectory of the locomotive" and "the innovation of this bus is not limited to the length, the most important thing is that it can be manipulated like a traditional bus, with no problems with operability and stability." Although the report said that "it can be manipulated like a traditional bus", it does not explain whether the bus can be steered as flexibly as the traditional bus, nor does it describe how the "special control system" works. In May 2015, Nanchang Public Transport Corporation, Jiangxi Province, China carried out operation and commissioning of the first BRT (Bus Rapid Transit) line "Super Bus" which has three carriages, with a total length of 27 meters and a capacity of 270 seats. It is reported that the "Super Bus" has an angle sensor installed at each hinge of the carriage such that once the turning angle is too large (i.e., the angle formed by two carriages exceeds 33 degrees), the driver will be alerted immediately. Obviously, the steering flexibility is limited. In addition, currently both "the world's longest bus" in Germany and the "Super Bus" in Nanchang have a maximum number of three carriages, with two trailers articulated to the locomotive.

The media referred to this articulated bus as a "small train" that does not require railroad tracks, which we call trackless train here. Obviously, the key for the trackless train to take advantages of both trams and traditional buses (i.e., it has a passenger capacity comparable to that of trams, and a construction and operating cost much lower than that of trams) lies in its flexibility. That is, like a traditional bus, it can turn at a small radius intersection and run on ordinary roads, and thus reducing the occupied road resources and alleviating traffic congestion.

SUMMARY OF THE INVENTION

One object of the present invention is to provide a steering control device for trackless train, which can effectively solve the problem that the trailer carriages articulated behind the locomotive turn along the same track as the locomotive, and theoretically the number of trailer carriages is not limited.

The other object of the present invention is to provide a steering control method for trackless train, which can effectively solve the problem that the trailer carriages articulated behind the locomotive turn along the same track as the locomotive, and theoretically the number of trailer carriages is not limited.

To solve foresaid technical problem, the present invention provides a steering control device and method for a trackless train, the train comprising a locomotive and a trailer carriage hinged to the locomotive, the locomotive is provided with a steering wheel, a clock and an odometer; the locomotive is provided with an axle for a pair of steering drive wheels and a controller, the steering wheel is provided with an angle sensor connected to an input end of a steering angle meter; the trailer carriage is provided with a pair of steered wheels having a steering mechanism; the controller includes the clock, the odometer, the steering angle meter and an optical network; the clock, the odometer and the steering angle meter all have signal output functions and their signal output ends are connected to an input end of the controller; an output end of the controller is connected to an input end of the steering mechanisms of the trailer carriage via the optical network. The steering drive wheels and steering angle thereof are controlled by the driver through the steering wheel. The controller records the time t(s) output by the clock, the mileage(m) output by the odometer and the steering angle $\alpha_0(t)$ of the steering drive wheels output by the steering angle meter.

The present invention provides a steering control device for a trackless train, the trackless train comprising a locomotive and a trailer carriage hinged to the locomotive. The locomotive of the trackless train is provided with a steering wheel, an axle for a pair of steering drive wheels, and a controller, wherein the steering wheel is provided with an angle sensor connected to an input end of a steering angle meter; the trailer carriage is provided with a pair of steered wheels having a steering mechanism; the clock, the odometer and the steering angle meter all have signal output functions and their signal output ends are connected to an input end of the controller; an output end of the controller is connected to an input end of the steering mechanisms of the trailer carriage via the optical network.

The steering mechanism is a rack and pinion steering mechanism.

The pinion of the rack and pinion steering mechanism is consolidated with an output shaft of a stepping motor.

The present invention further provides a steering control method for a trackless train, in which, assuming that the wheelbase between a steering drive wheel of a locomotive and a steered wheel of the kth trailer carriage is $L_k(m)$, and the time required for the trackless train to travel by a distance of $L_k(m)$ is $\Delta t_k$, then a control target of a steering angle $\alpha_k(t)$ output by a controller to a steering mechanisms of the kth trailer carriage via an optical network is calculated as follows in order to enable the steered wheel of the kth trailer carriage to follow the track of the steering drive wheel of the locomotive:

$$\alpha_k(t)=\alpha_0(t-\Delta t_k), k=1,2,3,\ldots,N$$

wherein N represents the number of trailer carriages of the trackless train subject to steering control, $N \geq 2$.

The locomotive is provided with a pair of follower wheels in addition to the steering drive wheel; a steering angle of the follower wheels of the locomotive is calculated based on the wheelbase between the steering drive wheel and the follower wheels of the locomotive and the steering angle of the steering drive wheel. With the above described control target and control method, the steered wheel of the kth trailer carriage is enabled to follow the track of the follower wheel of the locomotive.

The initial value of the steering angles of the locomotive and the respective trailer carriages may be set to 0, that is, the train is considered to be departing from a straight road.

Obviously, the present invention further provides a steering control method for a trackless train, that is, a wheel of a next trailer carriage refers to the steering angle of a wheel of a previous trailer carriage, whereby control of steering along the same track is achieved based on the wheelbase between the two wheels and the traveling time required for the trackless train to travel by the wheelbase.

The working principle of the invention is that the controller simultaneously records the time t(s) output by the clock, the mileage(m) output by the odometer and the steering angle $\alpha_k(t)$ of the steering drive wheels of the locomotive output by the steering angle meter, and can then fully describe and control a travelling track of the trackless train. Provided that the distance between the steering drive wheel of the locomotive and the steered wheel of the first trailer carriage is $L_1(m)$ and the time required for the trackless train to travel by a distance of $L_1(m)$ is $\Delta t_1$, then the steering angle of the steered wheel of the first trailer carriage at the time t is equal to the steering angle of the steering drive wheel of the locomotive at the time $t-\Delta t_1$, such that the steered wheels of the first trailer carriage and the steering drive wheels of the locomotives maintain the same track during travel. Similarly, provided that the distance between the steering drive wheel of the locomotive and the steered wheel of the second trailer carriage is $L_2(m)$ and the time required for the trackless train to travel by a distance of $L_2(m)$ is $\Delta t_2$, then the steering angle of the steered wheel of the second trailer carriage at the time t should be equal to the steering angle of the steering drive wheel of the locomotive at the time $t-\Delta t_2$, such that the steered wheels of the second trailer carriage and the steering drive wheels of the locomotives maintain the same track during travel, and so on.

As compared with the prior art, the present invention has the advantageous effects explained below:

1) The present invention can accurately control the steered wheel of the trailer carriage such that when the steered wheel of the trailer carriage reaches the position of the steering drive wheel of the locomotive, the steered wheel of the trailer carriage maintains the same steering angle of as the steering drive wheel of the locomotive. In this way, the subsequent articulated trailer carriages of the trackless train maintain the same track as the steered wheel of the locomotive. The number of articulated trailer carriages is theoretically unlimited and exceeds the number of trailer carriages of the existing "world's longest bus".

2) The present invention enables the trackless train to be driven as flexibly as a conventional bus and to operate on an ordinary road, thereby compressing the occupied road resources and alleviating traffic congestion.

3) The present invention only requires vehicle-mounted equipment, without adding any other ground equipment, and is thus simple, reliable and easy to implement.

DETAILED DESCRIPTION OF THE EMBODIMENTS

Embodiments

The invention is further described below in conjunction with the drawings and specific embodiments.

Figure 1:
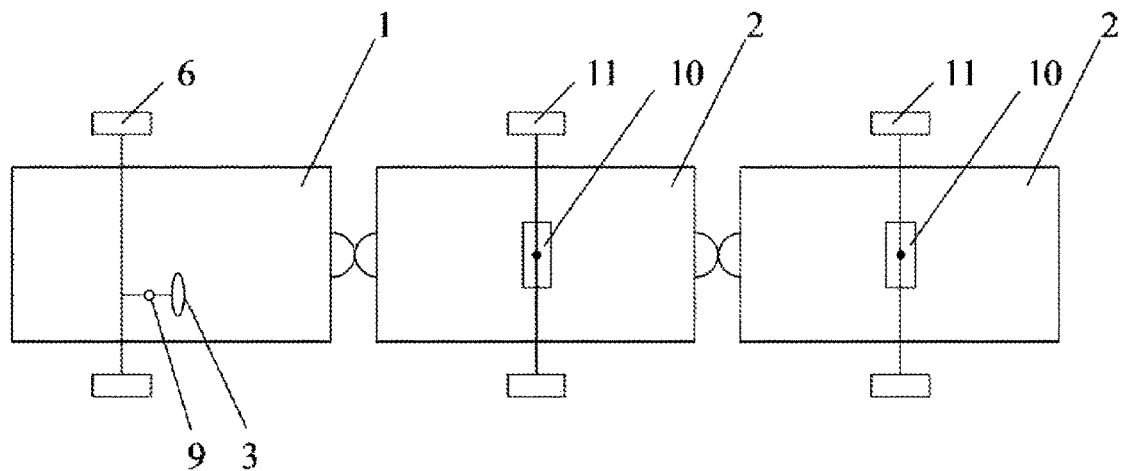
FIG. 1 is a schematic structural view of a trackless train according to an embodiment of the present invention.

FIG. 1 is a schematic structural view of a trackless train according to an embodiment of the present invention. As shown in FIG. 1, the trackless train comprises a locomotive (1) and one or more trailer carriages (2) hinged to the locomotive (1), the locomotive (1) is provided with a steering wheel (3), a clock (4) and an odometer (5); the locomotive (1) is provided with an axle for a pair of steering drive wheels (6) and a controller (7), the steering wheel (3) is provided with an angle sensor (9) connected to an input end of a steering angle meter (8); the trailer carriage (2) is provided with a pair of steered wheels (11) having a steering mechanism (10).

Figure 2:
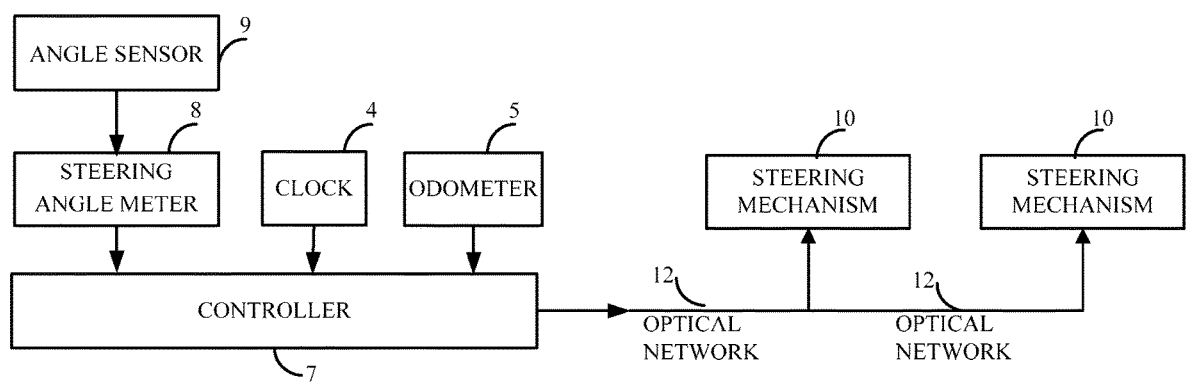
FIG. 2 is a schematic structural view of a steering control device according to an embodiment of the present invention.

FIG. 2 is a schematic structural view of a steering control device according to an embodiment of the present invention. As shown in FIG. 2, the locomotive (1) is provided with a controller (7); the clock (4), the odometer (5) and the steering angle meter (8) all have signal output functions and their signal output ends are connected to an input end of the controller (7); an output end of the controller (7) is connected to an input end of the steering mechanisms (10) of the trailer carriage (2) via an optical network (12).

Also disclosed is a steering control method for a trackless train, in which an steering drive wheel (6) and a steering angle thereof are controlled by the driver through a steering wheel (3) when the trackless train is running; a controller (7) records the time t(s) output by a clock (4), the mileage(m) output by an odometer (5) and a steering angle $\alpha_0(t)$ of a steering drive wheel (6) output by a steering angle meter (8); assuming that the wheelbase between the steering drive wheel (6) of a locomotive and a steered wheel (11) of the kth trailer carriage (2) is $L_k(m)$, and the time required for the trackless train to travel by a distance of $L_k(m)$ is $\Delta t_k$, then a control target of a steering angle $\alpha_k(t)$ output by the controller (7) to a steering mechanisms (10) of the kth trailer carriage (2) via an optical network (12) is calculated as follows in order to enable the steered wheel (11) of the kth trailer carriage (2) to follow the track of the steering drive wheel (6) of the locomotive:

$$\alpha_k(t)=\alpha_0(t-\Delta t_k), k=1,2,3,\ldots,N$$

wherein N represents the number of trailer carriages of the trackless train subject to steering control, N≥2.

The steering mechanism of the articulated trailer carriage is driven by a stepper motor, which is easy and accurate to operate.

Obviously, the present invention further provides a steering control method for a trackless train, that is, a wheel of a next trailer carriage refers to the steering angle of a wheel of a previous trailer carriage, whereby control of steering along the same track is achieved based on the wheelbase of the wheels and the traveling time required for the trackless train to travel by the wheelbase.

In addition to a pair of steered wheels, the last trailer carriage may also be provided with a pair of follower wheels at the rear thereof.

Figure 3:
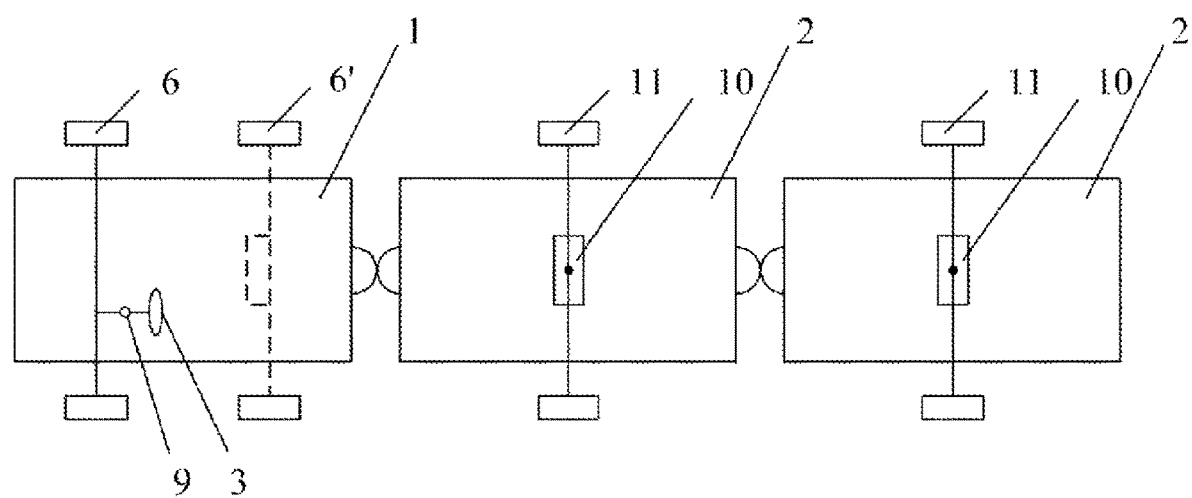
FIG. 3 is a schematic structural view of a trackless train having a locomotive follower wheel according to an embodiment of the present invention.

FIG. 3 is a schematic structural view of a trackless train having a locomotive follower wheel according to an embodiment of the present invention. The locomotive is provided with a pair of follower wheels (6') in addition to the steering drive wheel; a steering angle of the follower wheels of the locomotive is calculated based on the wheelbase between the steering drive wheel and the follower wheels of the locomotive and the steering angle of the steering drive wheel. With the above described control target and control method, the steered wheel (11) of the kth trailer carriage (2) is enabled to follow the track of the follower wheels (6') of the locomotive.

The initial value of the steering angles of the locomotive and the respective trailer carriages may be set to 0, that is, the train is considered to be departing from a straight road.

The invention claimed is:

1. A steering control device for a trackless train, comprising:
   an angle sensor for acquiring a steering angle of a steering drive wheel of a locomotive of the trackless train;
   a clock for acquiring a traveling time of the steering drive wheel of the locomotive of the trackless train;
   an odometer for acquiring a traveling mileage of the steering drive wheel of the locomotive of the trackless train; and
   a controller for controlling a steering angle of a steered wheel of a trailer carriage hinged to the locomotive in order to enable the steered wheel of the trailer carriage to follow a track of the steering drive wheel of the locomotive, according to the acquired steering angle, traveling time and traveling mileage of the steering drive wheels, wherein
   the controller further for controlling a steering angle $\alpha_k(t)$ of the kth trailer carriage based on the following formula, when the trackless train is running:

$$\alpha_k(t)=\alpha_0(t-\Delta t_k),$$

where t is the traveling time of the steering drive wheel, $\alpha_0(t)$ is the steering angle of the steering drive wheel, $\Delta t_k$ is a time required for the trackless train to travel by a distance of $L_k$, where $L_k$ is a wheelbase between the steering drive wheel of the locomotive and a steering wheel of the kth trailer carriage disposed behind the locomotive, and k=1, 2, 3, . . . , N, where N represents the number of trailer carriages of the trackless train subject to steering control, and N≥2, wherein the controller is further used for controlling a steering angle $\alpha_k(t)$ of the kth trailer carriage comprising:
   determining the steering angle $\alpha_k(t)$ of the kth trailer carriage based on the traveling time $\Delta t_k$ collected by the clock, the steering angle $\alpha_0(t-\Delta t_k)$ of the steering drive wheel collected by the angle sensor at time $t-\Delta t_k$, and the formula $\alpha_k(t)=\alpha_0(t-\Delta t_k)$, on the condition that the mileage output by the odometer indicates that the trackless train has traveled by the distance of $L_k$; and
   controlling the steering angle of the kth trailer carriage is output based on the steering angle $\alpha_k(t)$.

2. The steering control device for a trackless train according to claim 1, the controller is further used for performing the following steps:
   computing a steering angle of a follower wheel of the locomotive, according to a wheelbase between the steering drive wheel and the follower wheel and the steering angle of the steering drive wheel; and
   controlling the steering angle of the steered wheel of the trailer carriages in order to enable the steered wheel of the trailer carriage to follow a track of the follower wheel of the locomotive, according to the computed steering angle of the follower wheel and the acquired traveling time and traveling mileage of the follower wheels.

3. The steering control device for a trackless train according to claim 1, the locomotive is provided with a steering wheel for controlling the steering angle of the steering drive wheel.

4. The steering control device for a trackless train according to claim 1, the trailer carriage is provided with a steering mechanism for controlling the steering angle of the steered wheels.

5. The steering control device for a trackless train according to claim 4, further comprising:
   an optical network for connecting an output end of the controller to an input end of the steering mechanism.

6. A steering control method for a trackless train, comprising:
   acquiring a steering angle of a steering drive wheel of a locomotive of the trackless train;
   acquiring a traveling time of the steering drive wheel of the locomotive of the trackless train;
   acquiring a traveling mileage of the steering drive wheel of the locomotive of the trackless train; and
   controlling a steering angle of a steered wheel of a trailer carriage hinged to the locomotive in order to enable the steered wheel of the trailer carriage to follow a track of the steering drive wheel of the locomotive, according to the acquired steering angle, traveling time and traveling mileage of the steering drive wheels,
   the controlling a steering angle of a steered wheel of a trailer carriage hinged to the locomotive further comprising:
   controlling a steering angle $\alpha_k(t)$ of the kth trailer carriage based on the following formula, when the trackless train is running:

$$\alpha_k(t)=\alpha_0(t-\Delta t_k),$$

where t is the traveling time of the steering drive wheel, $\alpha_0(t)$ is the steering angle of the steering drive wheel, $\Delta t_k$ is a time required for the trackless train to travel by a distance of $L_k$, where $L_k$ is a wheelbase between the steering drive wheel of the locomotive and a steering wheel of the kth trailer carriage disposed behind the locomotive, and k=1, 2, 3, . . . , N, where N represents the number of trailer carriages of the trackless train subject to steering control, and N≥2, wherein the controlling a steering angle $\alpha_k(t)$ of the kth trailer carriage further comprises:

determining the steering angle $\alpha_k(t)$ of the kth trailer carriage based on the traveling time $\Delta t_k$ collected by a clock, the steering angle $\alpha_0(t-\Delta t_k)$ of the steering drive wheel collected by an angle sensor at time $t-\Delta t_k$, and the formula $\alpha_k(t)=\alpha_0(t-\Delta t_k)$, on the condition that the mileage output by an odometer indicates that the trackless train has traveled by the distance of $L_k$; and controlling the steering angle of the kth trailer carriage is output based on the steering angle $\alpha_k(t)$.

7. The steering control method for a trackless train according to claim 6, further comprising:

computing a steering angle of a follower wheel of the locomotive, according to a wheelbase between the steering drive wheel and the follower wheel and the steering angle of the steering drive wheel; and controlling the steering angle of the steered wheel of the trailer carriages in order to enable the steered wheel of the trailer carriage to follow a track of the follower wheel of the locomotive, according to the computed steering angle of the follower wheel and the acquired traveling time and traveling mileage of the follower wheels.

8. The steering control method for a trackless train according to claim 6, further comprising:

for any two trailer carriages mutually articulated, controlling a steering angle of a trailer carriage located behind, according to a steering angle of a steered wheel of a trailer carriage located at the front, a wheelbase of the two trailer carriages, and the time required for the trackless train to travel by the wheelbase.

* * * * *